United States Patent Office 3,591,557
Patented July 6, 1971

3,591,557
NOVEL FILM-FORMING HETEROCYCLIC CO-
POLYMER AND PROCESS FOR PRODUCING
THE SAME FROM DIAMINODIAMIDO COM-
POUNDS
Yasuo Miyadera, Tatuo Masuko, Tadashi Muroi, Michio
Kikkawa, Hiroshi Noguchi, Shinichi Okada, and Hideo
Kawashima, Hitachi-shi, Japan, assignors to Hitachi,
Ltd., Hitachi Cable, Ltd., and Hitachi Chemical Com-
pany, Ltd., all of Tokyo, Japan
No Drawing. Filed Oct. 1, 1968, Ser. No. 764,317
Int. Cl. C08g 20/32
U.S. Cl. 260—47                            24 Claims

ABSTRACT OF THE DISCLOSURE

A solid heterocyclic copolymer which is heat-stable and capable of forming cast film and fiber, especially useful for making abrasion- and alkali-resistant insulated wire, having a repeating unit of a combination of aromatic nucleus-fused bis(benzoylene quinazolone) and/or bis(benzoylene-4-thia-1,3-diazine dioxide) and N,N'-arylene-diisoindole dione. The polymer is produced by reacting aromatic diaminodiamido compounds and aromatic diamines with aromatic tetracarboxylic acid dianhydrides to form a new copolyamide, and cyclizing under dehydration the copolyamide.

---

The present invention relates to a thermostable, abrasion- and alkali-resistant film-forming heterocyclic copolymer and the process for the production thereof.

The novel heterocyclic copolymer of the present invention is represented by the repeating unit of a combination of the formulae

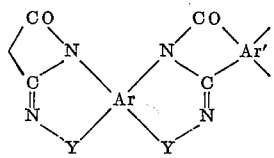

(I)

and

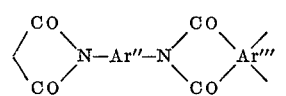

(II)

wherein Ar is a tetravalent aromatic residue in which each pair of N and Y attaches to the adjacent positions thereof, Y is $SO_2$ or CO, and Ar', Ar'' and Ar''' which may be the same or different are aromatic residues. The polymer may be constituted as a block type and as a random type copoly-condensed structure.

The novel heterocyclic copolymer of the present invention is useful for various formed articles such as fiber, film and especially for insulating electroconductive materials.

The recent tendency in manufacturing electric instruments and appliances is towards making them small and light as well as automatically working, thus requiring an insulated wire excellent in thermal stability and mechanical characteristics.

As to an insulated wire excellent in thermal stability, the wires coated with polyester or polyimide resin have been heretofore provided. Though the polyester-insulated wire is relatively excellent in mechanical characteristics, its thermal stability is so insufficient as to be classified in at most Class F, that is, utility temperature of up to 155° C., and this is not satisfactory. The polyimide resin is quite excellent in thermal stability, but its mechanical characteristics, especially the abrasion resistance, are inferior, and in addition its alkali resistance is unsatisfactory. These drawbacks constitute an obstacle for practical use of the polyimide resin.

The insulated wire coated with the new heterocyclic copolymer according to the present invention will resolve the above-mentioned drawbacks of the conventional insulated wires.

The present invention also relates to a novel copolyamide from which the above mentioned heterocyclic copolymer is prepared and which is also useful for producing molded articles such as fiber and film; paints, adhesives as well as electroinsulating materials.

The novel copolyamide is characterized by having a repeating unit of a combination of the following formulae

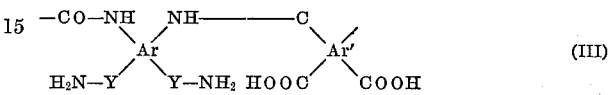

(III)

and

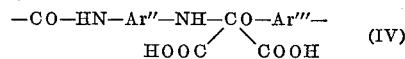

(IV)

wherein Ar, Ar', Ar'', Ar''' and Y as well as the positions of the Ar attached to —Y—$NH_2$ and —NH are the same as defined above.

The intermediate copolyamide corresponds preferably to the reducerd viscosity, $\eta sp./c.$, of at least 0.2 dl./g. as measured in a solution thereof in dimethylsulfoxide at a concentration of 0.1 g./100 ml. and at a temperature of 30° C.

The present inventors have studied a number of reactions in respect to various compounds for obtaining a polymer having the properties suitable for use as an electroinsulating material which does not have the above mentioned drawbacks of the conventional ones, and have found that a novel heterocyclic ring is formed by the following reaction:

(a)

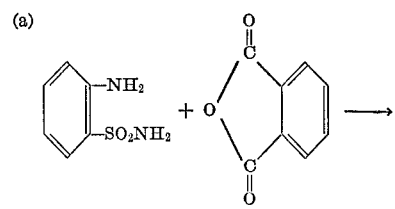

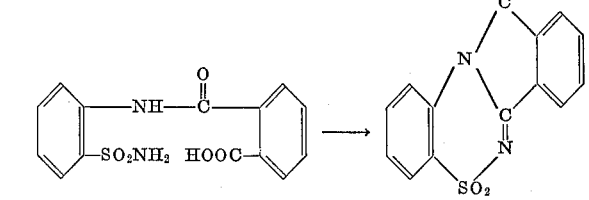

(b)

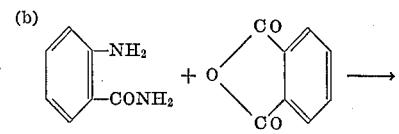

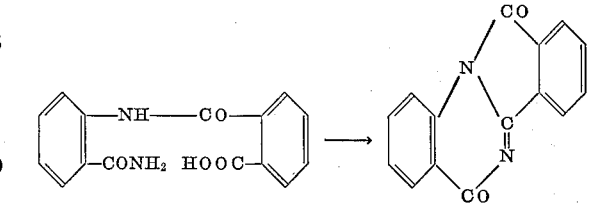

The present inventors developed the above reaction by applying it to polyfunctional aromatic compounds to obtain polymers. Thus, we have achieved the present invention concerning a process for producing the novel copolymer as represented by the repeating unit of a combination of the Formulae I and II, which process comprises reacting an aromatic tetracarboxylic acid dianhydride with an aromatic diaminodiamido compound of (V), (VI), (VII) and (VIII) as hereinafter defined and an aromatic diamine, in an inert solvent to obtain a copolyamide having a repeating unit of a combination of Formulae III and IV, and then cyclizing under dehydration the obtained copolyamide by heating or contacting with a dehydrating agent.

In the process above mentioned, the novel heterocyclic copolymer or copolyamide is formed as a block- or random-type copolymer.

The word "aromatic" used in the present specification and claims is contemplated to mean not only mononuclear and polynuclear conjugated rings but also the same linked mutually with or without an atom or radical which does not participate with the reaction.

The aromatic diaminodiamido compound used in the process of the present invention is selected from the group consisting of the compounds of the formulae

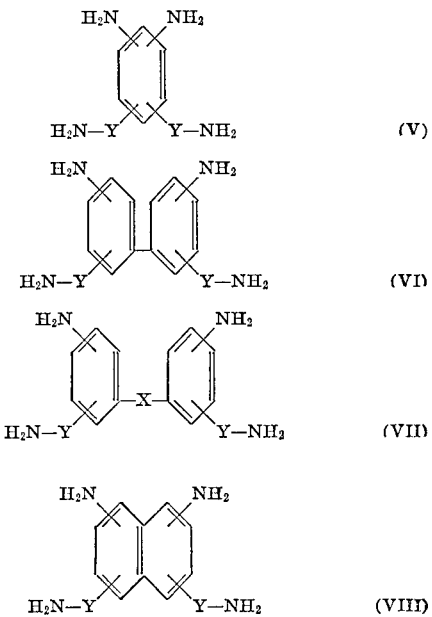

wherein Y and the positions of each aromatic ring attached to —$NH_2$ and —Y—$NH_2$ are the same as above without any restrictions, X is O, $CH_2$, $SO_2$, S or CO, and wherein the aromatic nucleus may be substituted with additional groups which do not participate with the reaction, such as alkyl, nitro groups and halogen atoms.

Therefore, one feature of the present invention resides in a new film-forming copolyamide having a repeating unit of a combination of Formulae III and IV and the production thereof comprising reacting at least one aromatic diaminodiamido compound of the Formulae V, VI, VII and VIII and at least one aromatic diamine, with at least one aromatic tetracarboxylic acid dianhydride and recovering the resulting copolyamide.

A further feature of the present invention resides in a new film-forming heterocyclic copolymer having a repeating unit of a combination of Formulas I and II and the production thereof comprising cyclizing under dehydration the above new copolyamide.

Another feature of the present invention resides in an electro-insulated wire having a coating of the heterocyclic copolymer above-mentioned and production thereof comprising applying the solution of said copolyamide onto the wire, removing the solvent to form a film of the copolyamide on the wire, and cyclizing under dehydration said copolyamide to form said heterocyclic copolymer in the form of insulating film.

The examples of such diaminodiamido compounds of the Formulae V, VI, VII and VIII include, for example, 4,4'-diaminodiphenylether-3,3'-disulfonamide,
4,4'-diaminodiphenylmethane-3,3'-disulfonamide,
4,4'-diaminodiphenyl-3,3'-disulfonamide,
4,4'-diaminodiphenylsulfone-3,3'-disulfonamide,
3,3'-diaminodiphenylether-4,4'-disulfonamide,
4,4'-diaminodiphenylsulfide-3,3'-disulfonamide,
4,4'-diaminobenzophenone-3,3'-disulfonamide;
4,4'-diaminodiphenylether-3,3'-dicarbonamide,
4,4'-diaminodiphenylmethane-3,3'-dicarbonamide,
4,4'-diaminodiphenyl-3,3'-dicarbonamide,
3,3'-diaminodiphenylether-4,4'-dicarbonamide,
4,4'-diaminodiphenylether-3-carbonamide-3'-sulfonamide;
1,4-diaminobenzene-2,5-disulfonamide,
1,3-diaminobenzene-4,6-disulfonamide,
1,3-diaminobenzene-4-sulfonamide-6-carbonamide,
1,4-diaminobenzene-2-sulfonamide-5-carbonamide;
2,7-diaminonaphthalene-3,6-disulfonamide,
2,7-diaminonaphthalene-3-sulfonamide-6-carbonamide,
2,6-diaminonaphthalene-3,7-disulfonamide,
2,6-diaminonaphthalene-3-sulfonamide-7-carbonamide,
1,5-diaminonaphthalene-2,6-disulfonamide,
1,5-diaminonaphthalene-2-sulfonamide-6-carbonamide,
1,6-diaminonaphthalene-2,5-disulfonamide,
1,6-diaminonaphthalene-2-carbonamide-5-sulfonamide,
1,6-diaminonaphthalene-2-sulfonamide-5-carbonamide,
1,6-diaminonaphthalene-2,7-disulfonamide,
1,6-diaminonaphthalene-2-carbonamide-7-sulfonamide,
1,6-diaminonaphthalene-2-sulfonamide-7-carbonamide,
1,7-diaminonaphthalene-2,6-disulfonamide,
1,7-diaminonaphthalene-2-carbonamide-6-sulfonamide
and
1,7-diaminonaphthalene-2-sulfonamide-6-carbonamide.

The aromatic diamine used in the present invention includes, for example, 4,4'-diaminodiphenylether, 4,4'-diaminodiphenylmethane, 4,4'-diaminodiphenylsulfone, 4,4'-diaminodiphenylsulfide, benzidine, m-phenylene diamine, p-phenylene diamine, 1,5-naphthylene diamine, 2,6-naphthylene diamine and the like.

The aromatic tetracarboxylic dianhydride used in the present invention includes, for example, 3,3',4,4'-benzophenone tetracarboxylic acid dianhydride, pyromellitic dianhydride, 3,3'-4,4'-diphenyl tetracarboxylic acid dianhydride, 1,2,5,6-naphthalene tetracarboxylic acid dianhydride, 2,3,6,7-naphthalene tetracarboxylic acid dianhydride, 2,3,5,6-pyridine tetracarboxylic acid dianhydride, 1,4,5,8-naphthalene tetracarboxylic acid dianhydride, 3,4,9,10-perylene tetracarboxylic acid dianhydride, 4,4'-sulfonyldiphthalic acid dianhydride and the like.

According to the present invention, the reaction is carried out in the presence of an inert solvent which is not always a solvent for all of the reactants. The particularly preferable solvent is capable of dissolving the resultant copolyamide. Examples of such a solvent include N-methyl-2-pyrrolidone, N,N-dimethylacetamide, N,N-dimethylformamide, N,N-diethylformamide, dimethylsulfoxide, hexamethylphosphoramide, tetrahydrothiophene-1,1-dioxide and the like as well as mixtures thereof.

In addition, a solubilizing agent which has been used for facilitating the resolution of a resin, such as lithium chloride and magnesium chloride, may be added thereto.

The reaction is carried out in the above-mentioned solvent in such a way that a reactant or reactants is dissolved as much as possible, while controlling the reaction temperature not to exceed more than 80° C., and preferably at room temperature or lower with stirring. The reaction can proceed smoothly by observing these conditions, and the viscosity of the reaction mixture increases gradually, showing the formation of the copolyamide.

Some of the embodiments of the procedures are illustrated as follows:

(a) simultaneous addition of all of the reactants into the inert solvent.
(b) addition of the tetracarboxylic acid dianhydride and then the diamino-diamido compound and the diamine into the inert solvent.
(c) addition of the diaminodiamido compound and then the diamine and the tetracarboxylic acid dianhydride.
(d) addition of the diamine and then the diaminodiamido compound and the tetracarboxylic dianhydride.

However, it will be appreciated that the present invention is not restricted to such procedures and that other procedures may be used optionally.

The thus obtained copolyamide solution may be used directly as a dope for making fiber, film and other formed articles by casting, but, if desired, the copolyamide may be recovered, for instance, by evaporating the solvent preferably under reduced pressure or pouring the solution into a non-solvent such as methanol to precipitate the copolyamide.

The copolyamide can be converted into the heterocyclic copolymer either by heating at a tempeature of 200 to 400° C. and, if desired, under reduced pressure, or by contacting the copolyamide with a dehydrating agent such as the complex of dimethyl formamide and sulfur trioxide and preferably while heating at about 150° C., resulting in ring-closure under dehydration.

When the above treatment is effected at a relatively high temperature, a cross-linked polymer which is also useful for insulating coatings may be formed as shown by the following scheme:

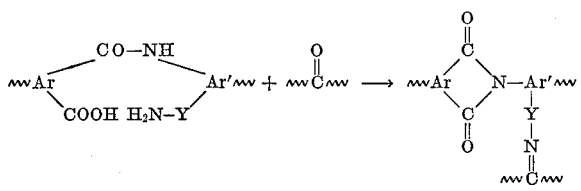

As previously mentioned, the heterocyclic copolymer of the present invention has excellent properties such as thermal stability, abrasion and chemical resistance, and is a very useful material for electro-insulation, lamination, adhesives, paints or formed articles. In response to such various usages, the polymer can be made from the copolyamide in various stages when converting the copolyamide thereinto. For instance, when the polymer is used for molding insulation on a wire coil, the wire coil is impregnated with the solution of the copolyamide followed by ring-closing under heating. When it is used as an insulating coating, a substrate is applied with the copolyamide solution to form a coating, and then the coating is subjected to ring-closure by heating. When a formed article is needed, the copolyamide is filled in a mold and then ring-closed by heating or by a dehydrating agent which has been simultaneously added with the copolyamide. Furthermore, when it is used as an insulating film, the film is formed by casting the solution of copolyamide and heating the film of copolyamide to ring-close the same. This film can be used in an electric appliance. It goes without saying that the copolyamide solution may be applied to the appliance to form its film and then the film may be ring-closed. In short, the time for ring-closure may be selected at the convenience of the working without any limitation. Thus, an electric insulation excellent in thermal stability, mechanical characteristics and chemical resistance can be obtained.

The following examples are given to illustrate the present invention, but it should be understood that the present invention is not limited thereto. The reduced viscosity, $\eta_{sp./c.}$, referred to therein is measured in the solution of the copolyamide in dimethyl sulfoxide at a concentration of 0.1 gram/100 ml. and at a temperature of 30° C.

EXAMPLE 1

Into a three-necked 500 ml. flask equipped with a thermometer, stirrer and calcium chloride tube, 8.95 grams of 4,4' - diaminodiphenyl-ether-3,3'-disulfonamide, 7.15 grams of 4,4' - diaminodiphenylether-3,3'-dicarbonamide, 10.0 grams of 4,4'-diaminodiphenylether and 300 ml. of N,N-dimethylacetamide were placed, and the mixture was stirred while cooling the flask in an ice bath. To the mixture, 21.8 grams of pyromellitic dianhydride were added stepwise, and the reaction was continued for 9 hours after the addition of the dianhydride. After the completion of the reaction, a part taken out of the resulting reaction mixture was poured into methanol to precipitate the product and its reduced viscosity ($\eta_{sp./c.}$) was measured. The value of $\eta_{sp./c.}$ was 0.97 dl./g.

A tough film of the copolyamide was obtained by casting the reaction mixture (solution) onto a glass plate and evaporating the solvent.

The mechanical properties of the thus obtained film were 700 kg./cm.² in tensile strength and 10 percent in ultimate elongation.

EXAMPLE 2

Into a 50 ml. flask similar to that used in Example 1, 1.79 grams of 4,4'-diaminodiphenylether-3,3'-disulfonamide, 1.0 grams of 4,4'-diaminodiphenylether and 30 ml. of N,N-dimethylacetamide were placed, and the mixture was well stirred while cooling by means of an ice bath. To the mixture, 3.22 grams of 3,3',4,4'-benzophenone tetracarboxylic acid dianhydride were added stepwise, and the reaction was effected for 7 hours.

The reduced viscosity of the resultant copolyamide was 1.09 dl./g.

A tough film having a tensile strength of 600 kg./cm.² and an elongation at break of 10 percent was obtained by the procedure as described in Example 1.

EXAMPLE 3

Example 2 was repeated excepting the use of 1.42 grams of 4,4'-diaminodiphenylmethane - 3,3' - dicarbonamide, 1.0 gram of 4,4'-diaminodiphenylether and 3.22 grams of 3,3',4,4'-benzophenone tetracarboxylic acid dianhydride as the reactants, and 30 ml. of N,N-dimethylformamide as the solvent. The reaction was continued for 10 hours. The reduced viscosity of the thus obtained copolyamide was 0.82 dl./g.

A tough film of the copolyamide was obtained by the same procedure as in Example 1. The tensile strength and elongation at break of the film were 500 kg./cm.² and 12 percent, respectively.

EXAMPLE 4

Example 2 was repeated excepting the use of 2.675 grams of 4,4'-diaminodiphenylether - 3,3' - disulfonamide, 0.5 gram of 4,4'-diaminodiphenylether, 1.61 grams of 3,3'4,4'-benzophenone tetracarbonyl acid dianhydride and 1.09 grams of pyromellitic dianhydride as the reactants, and 30 ml. of N,N-dimethylacetamide as the solvent. The reduced viscosity, $\eta_{sp./c.}$, of the resultant copolyamide was 1.10 dl./g.

The mechanical properties of a film prepared by casting the reaction mixture as described in Example 1 were 900 kg./cm.² in tensile strength and 11 percent in elongation at break.

EXAMPLE 5

Into a three-necked 1000 ml. flask equipped with a thermometer, stirrer and calcium chloride tube, 32.2 grams (0.09 mole) of 4,4'-diaminodiphenylether - 3,3'-disulfonamide and 2.0 grams (0.01 mole) of 4,4'-diaminodiphenylether were placed, and then 500 ml. of N-methyl-2-pyrrolidone were added thereto. The mixture was well stirred while cooling with an ice bath. To the solution, 32.2 grams (0.1 mole) of 3,3',4,4'-benzophenone tetracarboxylic acid dianhydride were added stepwise. After the addition, the mixture was allowed to react for 7 hours after removing the ice bath.

After the completion of the reaction, a part taken out of the reaction mixture was poured into methanol to precipitate the product, and the precipitate was filtered off and dried in the form of a powder. The reduced viscosity, $\eta_{sp./c.}$, of the thus obtained copolyamide was 0.98 dl./g. The reaction mixture in the form of a solution was casted into a tough film.

The dried powder of the copolyamide was converted into benzoylene zenzothiadiazine dioxide/imide copolymer by treating it with a solution of the complex of dimethylformamide and sulfur trioxide in dimethylformamide at a temperature of 150° C. for 5 hours to cause the ring-closure of the copolyamide. No reduction of weight of the polymer was observed even when heating in the air atmosphere up to 500° C., and no hydrolysis occurred when placing it in a 5 percent aqueous solution of sodium hydroxide. The polymer showed a pencil hardness of 7H class and very excellent abrasion resistance.

EXAMPLE 6

Example 5 was repeated excepting the use of 17.9 grams (0.05 mole) of 4,4' - diaminodiphenylether - 3,3'-disulfonamide, 10.0 grams (0.05 mole) of 4,4'-diaminodiphenylether and 32.2 grams (0.1 mole) of 3,3',4,4'-benzophenone tetracarboxylic acid dianhydride as the reactants, and 500 ml. of N-methyl-2-pyrrolidone as the solvent. The reaction was continued for 7 hours.

The reduced viscosity ($\eta_{sp./c.}$) of the resultant copolyamide was 0.81 dl./g. From the copolyamide, a tough film was prepared by casting. The copolyamide was converted under ring-closure, into benzoylene benzothiadiazine dioxide/imide copolymer by the same procedure as in Example 5. There is observed no reduction of weight of the polymer during heating it up to 500° C. in the air atmosphere.

EXAMPLE 7

Example 6 was repeated excepting the use of a similar 1000 ml. flask; 17.9 grams of 4,4'-diaminodiphenylether-3,3'-disulfonamide, 10.0 grams of 4,4'-diaminodiphenylether, 10.9 grams of pyromellitic dianhydride and 16.1 grams of 3,3',4,4'-benzophenone tetracarboxylic acid dianhydride as the reactants, and 500 ml. of N,N-dimethylacetamide as the solvent. The copolyamide thus obtained had a reduced viscosity of 0.64 dl./g. From the copolyamide, a tough film was prepared by the same procedure as in Example 5.

A film of benzoylene benzothiadiazine dioxide/imide copolymer was obtained by heating the copolyamide film at a temperature of 200 to 400° C. to cause the ring-closure. No reduction of weight of the film thus obtained was observed when heating it up to 450° C. in the air atmosphere.

EXAMPLE 8

Into a similar flask to that used in Example 5, 8.95 grams of 4,4'-diaminodiphenylether-3,3' - disulfonamide and 15.0 grams of 4,4'-diaminodiphenylether were placed, and 300 ml. of N,N-dimethylacetamide were added thereto. The mixture was stirred sufficiently while cooling by means of an ice bath. 15.35 grams of pyromellitic dianhydride and 8.05 grams of 3,3',4,4'-benzophenone tetracarboxylic acid dianhydride were added thereto stepwise. After removing the ice bath, the reaction was continued for 7 hours. The reduced viscosity, $\eta_{sp./c.}$, of the product was 0.92 dl./g. From the product, a film having a thickness of 25μ was prepared, and the film was heated at 200 to 400° C. to obtain benzoylene benzothiadiazine dioxide/imide copolymer as the result of ring-closure. The tensile strength and elongation at break of the film of the copolymer were 2000 kg./cm.² and 30 percent at 25° C., respectively. No reduction of weight was observed when heating the film up to 450° C. in the air atmosphere.

EXAMPLE 9

Into a similar flask, 8.95 grams of 4,4'-diaminodiphenylether - 3,3' - disulfonamide and 45.0 grams of 4,4'-diaminodiphenylether were placed, and 500 ml. of N,N-dimethylacetamide were added thereto. The mixture was well agitated while cooling with an ice bath, and was added stepwise with a mixture of 40.88 grams of pyromellitic dianhydride and 20.1 grams of 3,3',4,4'-benzophenone tetracarboxylic acid dianhydride. After removing the ice bath, the reaction was effected for 7 hours. The $\eta_{sp./c.}$ of the reaction product was 0.89 dl./g.

A tough film was obtained from the product by the use of the same procedure as in Example 5. When the film was heated at a temperature of 200 to 400° C., the film of benzoylene benzothiadiazine dioxide/imide copolymer was obtained as the result of ring-closure. No reduction of weight was observed when the film was heated up to 450° C. in the air atmosphere.

EXAMPLE 10

Into a three necked flask having a capacity of 500 ml. provided with thermometer, stirrer and calcium chloride tube, 25.56 grams (0.09 mole) of 4,4'-diaminodiphenylmethane - 3,3' - dicarbonamide and 2.0 grams (0.01 mole) of 4,4'-diaminodiphenylether were charged, and 300 ml. of N,N-dimethylformamide was added thereto. The mixture was added stepwise with 32.2 g. (0.1 mole) of 3,3',4,4'-benzophenone tetracarboxylic acid dianhydride while stirring. After the addition, the reaction was continued for 7 hours. The $\eta_{sp./c.}$ of the reaction product was 0.76 dl./g.

A tough film was obtained from the product by the same procedure as in Example 5. When the film was heated at 350° C., the film of benzoylene quinazolone/imide copolymer was formed as the result of ring-closure, and the thus formed film showed no reduction of its weight when heated to 500° C. in the air atmosphere.

EXAMPLE 11

Into a similar flask as used in Example 10, there are placed 14.2 grams (0.05 mole) of 4,4'-diaminodiphenylmethane-3,3'-dicarbonamide, 10.0 grams (0.05 mole) of 4,4'-diaminodiphenylether and 300 ml. of N,N-dimethylformamide. To the mixture, 21.8 grams (0.1 mole) of pyromellitic dianhydride was added stepwise while stirring, and the reaction was continued for 9 hours.

The thus obtained product had a reduced viscosity ($\eta_{sp./c.}$) of 0.65 dl./g. from which a tough film was obtained by the same procedure as in Example 5. A film of benzoylene quinazolone/imide copolymer was produced by subjecting the film to heat-treatment at a temperature of 350° C. to cause ring-closure. No reduction of weight of the polymer film was observed when heating at 500° C. in the air atmosphere.

EXAMPLE 12

Into a similar flask as used in Example 10, there are placed 8.95 grams (0.025 mole) of 4,4'-diaminodiphenylether-3,3'-disulfonamide, 7.15 grams (0.025 mole) of 4,4'-diaminodiphenylether - 3,3'-dicarbonamide, 10.0 grams (0.05 mole) of 4,4'-diaminodiphenylether and 300 ml. of N,N-dimethylacetamide. The mixture was well stirred and was added stepwise with 32.2 grams (0.1 mole) of 3,3',4, 4'-benzophenone tetracarboxylic acid dianhydride. The reaction was effected for 9 hours at room temperature.

The reduced viscosity ($\eta_{sp./c.}$) of the thus obtained product was 0.91 dl./g. When the product was heated at 200 to 400° C., the copolymer of benzoylene benzothiadiazine dioxide/benzoylene quinazolone/imide was produced as the result of ring-closure. The polymer showed no reduction of weight even when it was heated up to 500° C. in the air atmosphere.

EXAMPLE 13

Into a three necked 1000 ml. flask equipped with thermometer, stirrer and calcium chloride tube, 17.9 grams of 4,4'-diaminodiphenylether-3,3'-disulfonamide and 30.0 grams of 4,4'-diaminodiphenylether were placed and then 600 ml. of N-methyl-2-pyrrolidone was added thereto. The mixture was well stirred and cooled with an ice bath, and was added stepwise with 64.4 grams of 3,3',4,4'-benzophenone tetracarboxylic acid dianhydride. After the addition, the increase of viscosity of the reaction system occurred considerably, and reaction was still continued for 7 hours while stirring. The viscosity after the completion of the reaction showed 70 stokes. The reduced viscosity ($\eta_{sp./c.}$) of the separated product was 0.53 dl./g.

The reaction mixture was repeatedly applied to an electroconductive wire followed by baking to obtain an insulated wire having the coatings of the copolymer on its surface. The coatings consisting of a copolymer of the units of benzoylene benzothiadiazine dioxide/imide as the result of cross-linking or double ring-closing and having a thickness of about 0.04 mm., are of excellent properties, in particular, in thermal stability, abrasion and alkali resistances.

EXAMPLE 14

Into a three necked 3000 ml. flask equipped with thermometer, stirrer and calcium chloride tube, 21.5 grams of 4,4'-diaminodiphenylether-3,3'-disulfonamide and 108 grams of 4,4'-diaminodiphenylether were placed and then 1777 ml. of N-methyl-2-pyrrolidone was added thereto while stirring. To the mixture, 193 grams of 3,3',4,4'-benzophenone tetracarboxylic acid dianhydride was added stepwise, and the reaction was effected for 7 hours after the addition. The viscosity of the reaction mixture showed 98.5 stokes after the completion of the reaction. The reduced viscosity ($\eta_{sp./c.}$) of the product was 0.64 dl./g.

An insulated wire having the polymer coatings of about 0.04 mm. in thickness was produced from the reaction mixture by the same procedure as described in Example 13.

EXAMPLE 15

Example 14 was repeated excepting the use of 28.7 grams of 4,4'-diaminodiphenylether-3,3'-disulfonamide, 144 grams of 4,4'-diaminodiphenylether and 87.15 grams of pyromellitic dianhydride and 128.8 grams of 3,3',4,4'-benzophenone tetracarboxylic acid dianhydride as the reactants, and 2225 ml. of N-methyl-2-pyrrolidone as the solvent.

The viscosity of the reaction mixture after the completion of reaction was 10.7 stokes. The reduced viscosity of the separated product showed 0.54 dl./g.

An excellent insulated wire having the polymer coatings of about 0.04 mm. in thickness was obtained by the procedure as described in Example 13.

EXAMPLE 16

Example 14 was repeated excepting the use of 71.5 grams of 4,4'-diaminodiphenylether-3,3'-dicarbonamide, 150 grams of 4,4'-diaminodiphenylether, 163.5 grams of pyromellitic dianhydride and 80.5 grams of 3,3',4,4'-benzophenone tetracarboxylic acid dianhydride as the reactants and 2000 ml. of N,N-dimethylacetamide as the solvent, as well as of the reaction time of 10 hours.

The viscosity of the reaction mixture showed 250 stokes and the resultant copolyamide had a reduced viscosity of 0.84 dl./g.

An insulated wire having the polymer coatings of a thickness of about 0.04 mm. was produced by the procedure as described in Example 13.

EXAMPLE 17

Example 14 was repeated excepting the use of 35.8 grams of 4,4'-diaminodiphenylether-3,3'-disulfonamide, 180 grams of 4,4'-diaminodiphenylether, 163.5 grams of pyromellitic dianhydride and 80.5 grams of 3,3',4,4'-benzophenone tetracarboxylic acid dianhydride as the reactants, and 2000 ml. of N,N-dimethylacetamide as the solvent.

The viscosity of the reaction mixture was 200 stokes, and the resultant copolyamide had a reduced viscosity ($\eta_{sp./c.}$) of 0.88 dl./g.

An insulated wire having the polymer coatings of a thickness of about 0.04 mm. was produced by the procedure as desrribed in Example 13.

EXAMPLE 18

Example 13 was repeated excepting the use of 35.8 grams of 4,4'-diaminodiphenylether-3,3'-disulfonamide, 20.0 grams of 4,4'-diaminodiphenylether and 64.4 grams of 3,3',4,4'-benzophenone tetracarboxylic acid dianhydride as the reactants, and 600 ml. of N-methyl-2-pyrrolidone as the solvent, as well as the reaction time of 10 hours.

The viscosity of the resulting reaction mixture showed 140 stokes, and the isolated copolyamide therefrom had an $\eta_{sp./c.}$ of 0.56 dl./g.

An insulated wire having the polymer coatings of about 0.04 mm. in thickness was produced by the procedure as described in Example 13.

EXAMPLE 19

Example 14 was repeated excepting the use of 143.2 grams of 4,4'-diaminodiphenylether-3,3'-disulfonamide, 20.0 grams of 4,4'-diaminodiphenylether, 54.5 grams of pyromellitic dianhydride and 80.5 grams of 3,3',4,4'-benzophenone tetracarboxylic acid dianhydride as the reactants and 2000 ml. of N-methyl-2-pyrrolidone as the solvent.

The viscosity of the reaction mixture was 90 stokes, and the isolated copolyamide therefrom had an $\eta_{sp./c.}$ of 0.92 dl./g.

By using the procedure described in Example 13, an insulated wire having coatings of the heterocyclic copolymer in a thickness of about 0.04 mm. was produced.

EXAMPLE 20

Example 14 was repeated excepting the use of 71.5 grams of 4,4'-diaminodiphenylether-3,3'-dicarbonamide, 89.5 grams of 4,4'-diaminodiphenylether-3,3'-disulfonamide, 100 grams of 4,4'-diaminodiphenylether, 109 grams of pyromellitic dianhydride and 161 grams of 3,3',4,4'-benzophenone tetracarboxylic acid dianhydride as the reactants, and 2000 ml. of N,N-dimethylacetamide as the solvent as well as the reaction time of 10 hours.

The viscosity of the reaction mixture was 180 stokes, and the isolated copolyamide had an $\eta_{sp./c.}$ of 0.96 dl./g.

An insulated wire having coatings of the polymer in a thickness of about 0.04 mm. was produced by the procedure as described in Example 13.

As previously mentioned, the new heterocyclic copolymer is above all useful for insulating coatings on electric conductive materials, especially wire or cable.

The performance of such effects is shown in the following table in which the properties of the insulated wires obtained in Examples 13 to 20 are summarized together with that of the wire insulated with a conventional polyimide insulating resin, "Pyre ML," sold as trade name by Du Pont de Nemours and Company, which is produced by the same procedure as described in Example 13, for comparison.

|  | Samples | | | | | | | | |
| --- | --- | --- | --- | --- | --- | --- | --- | --- | --- |
|  | Example | | | | | | | | Comparison |
|  | 13 | 14 | 15 | 16 | 17 | 18 | 19 | 20 | |
| Baking conditions: | | | | | | | | | |
| Diameter of bare wire, mm | 1.000 | 1.000 | 1.000 | 1.000 | 1.002 | 1.000 | 1.000 | 1.000 | 1.000 |
| Thickness of coatings, mm | 0.040 | 0.040 | 0.039 | 0.040 | 0.040 | 0.039 | 0.041 | 0.040 | 0.040 |
| Baking temperature, °C | 400 | 400 | 400 | 400 | 400 | 400 | 400 | 400 | 400 |
| Drawing speed, m./mm | 8.0 | 8.0 | 8.0 | 8.0 | 8.0 | 8.0 | 8.0 | 8.0 | 8.0 |
| Performance: | | | | | | | | | |
| Pin-hole, number/5m | 0 | 0 | 0 | 0 | 0 | 0 | 0 | 0 | 0 |
| Winding ability (mandrel test): | | | | | | | | | |
| Initial | 1d-ok | 1d-ok | 1d-ok | 1d-ok | 1d-ok | 1d-ok | 1d-ok | 1d-ok | 1d-ok |
| After aging at 250° C. for 24 hours | 1d-ok | 1d-ok | 1d-ok | 1d-ok | 1d-ok | 1d-ok | 1d-ok | 1d-ok | 1d-ok |
| Softening point under load of 1 kg., °C | <400 | <400 | <400 | <400 | <400 | <450 | <450 | <450 | <400 |
| Heat-shock resistance (300° C. for 1 hour) | 1d-ok | 1d-ok | 1d-ok | 1d-ok | 1d-ok | 1d-ok | 1d-ok | 1d-ok | 1d-ok |
| Abrasion resistance: NEMA (repeated scrape test), times | 181 | 132 | 124 | 148 | 103 | 217 | <300 | 206 | 19 |
| Pencil hardness | 6H | 6H | 6H | 6H | 6H | 7H | 7H | 7H | 4H |
| Torsion number (20 cm.) | 69 | 87 | 92 | 72 | 86 | 67 | 61 | 65 | 83 |
| Break down voltage (v.): | | | | | | | | | |
| Initial | 11,000 | 13,000 | 12,000 | 10,900 | 12,000 | 10,100 | 10,300 | 10,600 | 11,000 |
| After aging at 300° C. for 24 hours | 9,900 | 12,800 | 12,600 | 10,100 | 12,500 | 10,800 | 9,800 | 11,200 | 10,500 |
| Chemical and solvent resistance, (at room temperature for 24 hours): | | | | | | | | | |
| Sulfuric acid (specific gravity 1.2) | 6H | 6H | 6H | 6H | 6H | 7H | 7H | 7H | 4H |
| Caustic soda (10% solution) | 4H | 4H | 4H | 4H | 3H | 6H | 6H | 6H | (1) |
| Ethanol | 6H | 6H | 6H | 6H | 6H | 7H | 7H | 7H | 4H |
| Benzene | 6H | 6H | 6H | 6H | 6H | 7H | 7H | 6H | 4H |

[1] Swelling.

As shown in the above table, the insulated wires according to the present invention are not only remarkably excellent in such properties as the abrasion resistance and chemical resistance such as alkali-resistance as compared with the conventional polyimide-insulated wire, but also their thermal stability is excellent. In addition, such properties maintain a very good balance, due to the new co-polycondensed heterocyclic ring or cross-linked structure occurring in the polymer.

The formation of the new heterocyclic ring in the recurring unit of the polymer of the present invention is confirmed by the occurrence of the reactions shown in the Formulae (a) and (b) previously mentioned, and the reactions are illustrated by the following examples.

EXAMPLE 21

Into a three necked 100 ml. flask provided with a thermometer, stirrer and calcium chloride tube, 1.72 grams of 2-aminobenzenesulfonamide and 15 ml. of acetone were placed and agitated. The mixture was added with a solution of 1.48 grams of phthalic anhydride in 15 cc. of acetone at room temperature. The reaction was completed immediately after the addition, and 2-carboxybenzoyl-aminobenzene-2-sulfonamide was recovered from the reaction mixture by distilling off acetone. The product was recrystallized from ethyl alcohol. The melting point of the compound was 157° C., and elemental analysis showed as follows:

Calculated for $C_{14}H_{12}N_2O_5S$ (percent): C, 52.50; H, 3.75; N, 8.75. Found (percent): C, 52.41; H, 3.85; N, 8.46.

2-carboxybenzoylaminobenzene-2-sulfonamide thus obtained was heated at a temperature of 200° C. for 1 hour, and the product was recrystallized from benzene. Benzoylene 1,2,4-benzothiodiazine-1,1-dioxide which melts at 274 to 275° C. was obtained in the theoretical yield of 96.6%. The elemental analysis shows as follows:

Calculated for $C_{14}H_8N_2O_3S$ (percent): C, 59.15; H, 2.82; N, 9.87. Found (percent): C, 59.13; H, 2.86; N, 9.65.

EXAMPLE 22

Into a three-necked 200 ml. flask as provided in Example 21, 13.6 grams of 2-aminobenzamide and 100 ml. of N,N-dimethylacetamide were placed and well agitated. To the mixture, 14.8 grams of phthalic anhydride were added, and the reaction was continued for 30 minutes at room temperature with stirring. After the completion of reaction, the reaction mixture was poured into water to precipitate the product. The product recrystallized from water melts at 188° C. The product was confirmed as 2-carboxybenzoylaminobenzamide-(2) from the result of the following elemental analysis:

Calculated for $C_{15}H_{12}N_2O_4$) (percent): C, 72.58; H, 3.23; N, 11.29. Found (percent): C, 72.64; H, 3.10; N, 11.37.

2 - carboxybenzoylaminobenzamide - (2) thus obtained was heated at a temperature of 200° C. for 1 hour and then at 240° C. for 5 minutes. Benzoylene quinazolone was obtained as the result of ring-closure. This product melts at 229° C. after being recrystallized from benzene. The structure was confirmed by elemental analysis and infra-red spectra. The analysis shows as follows:

Calculated for $C_{15}H_8N_2O_2$ (percent): C, 72.58; H, 3.23; N, 11.29. Found (percent): C, 72.64; H, 3.10; N, 11.37.

The formation of the new heterocyclic ring in the unit of the polymers is also confirmed by means of infra-red analysis. The infra-red spectrum shows an absorption at 1625 cm.$^{-1}$ which corresponds to the group C=N.

What we claim is:

1. A novel film-forming heterocyclic copolymer consisting essentially of in combination the repeating units of the formulae

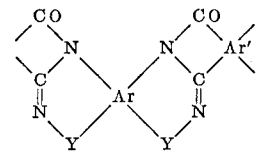

(I)

and

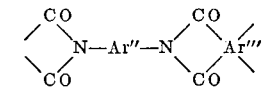

(II)

wherein Ar is a tetravalent aromatic residue selected from the group consisting of benzene, naphthalene, diphenyl, diphenyl sulfone, diphenyl ether, diphenylmethane, diphenyl sulfide and benzophenone, Ar', Ar" and Ar''' which may be the same or different are aromatic mononuclear or polynuclear conjugated rings linked mutually with or without an atom or radical which does not participate in the reaction, and Y is a member selected from the group consisting of $SO_2$ and CO, Y and N being attached to the aromatic nucleus of the Ar at adajcent positions thereon, said copolymer having a softening point under a load of 1 kg. of at least 400° C.

2. A novel film-forming heterocyclic copolymer according to claim 1 wherein said copolymer is selected from the group consisting of block- and random-type copolymers.

3. A novel film-forming heterocyclic copolymer consisting essentially of in combination the repeating units of the formulae

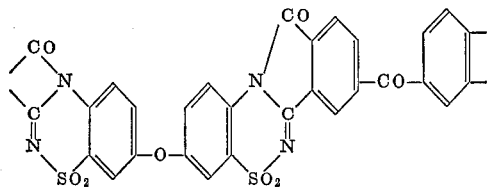

and

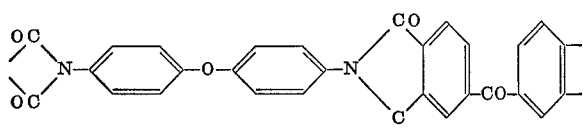

said copolymer having a softening point under a load of 1 kg. of at least 400° C.

4. A novel film-forming heterocyclic copolymer consisting essentially of in combination the repeating units of the formulae

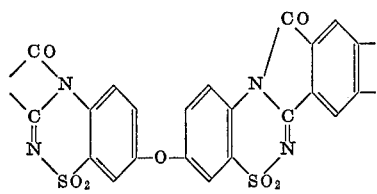

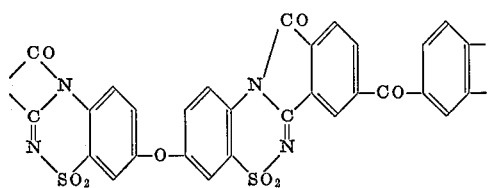

and

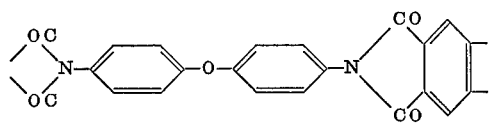

said copolymer having a softening point under a load of 1 kg. of at least 400° C.

5. A novel film-forming heterocyclic copolymer consisting essentially of in combination the repeating units of the formulae

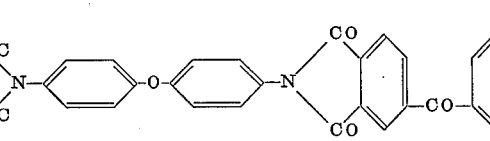

and

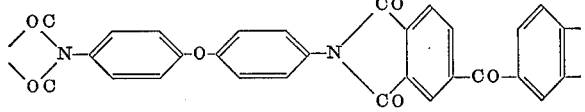

said copolymer having a softening point under a load of 1 kg. of at least 400° C.

6. A novel film-forming heterocyclic copolymer consisting essentially of in combination the repeating units of the formulae

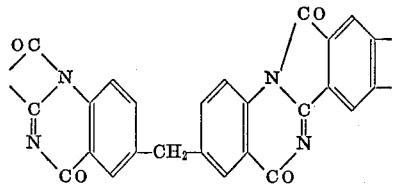

and

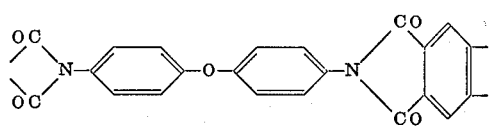

said copolymer having a softening point under a load of 1 kg. of at least 400° C.

7. A novel film-forming heterocyclic copolymer consisting essentially of in combination the repeating units of the formulae

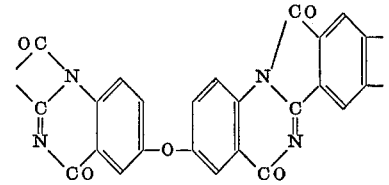

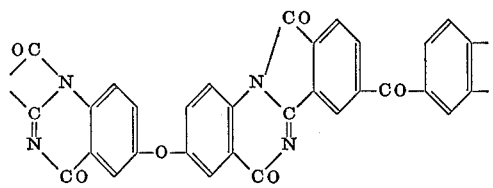

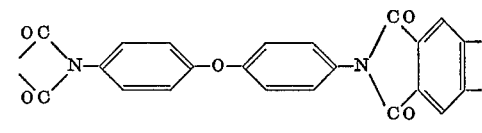

and

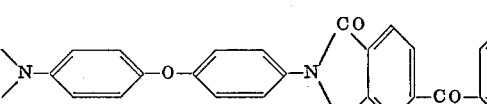

said copolymer having a softening point under a load of 1 kg. of at least 400° C.

8. A novel film-forming heterocyclic copolymer consisting essentially of in combination the repeating units of the formulae

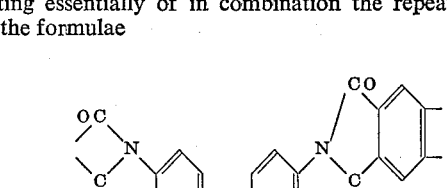

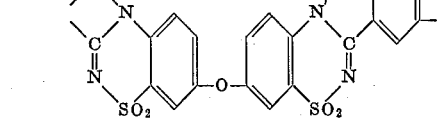

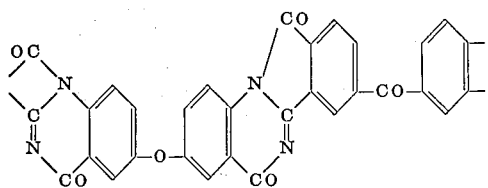
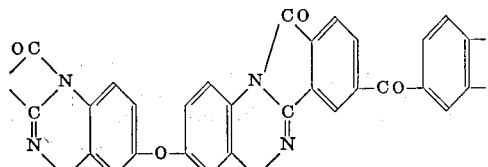
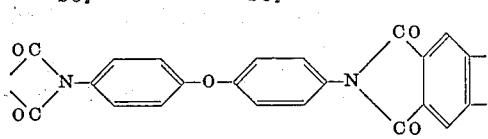

and

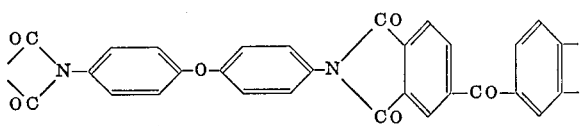

said copolymer having a softening point under a load of 1 kg. of at least 400° C.

9. A novel film-forming copolyamide consisting essentially of in combination the repeating units of the formulae

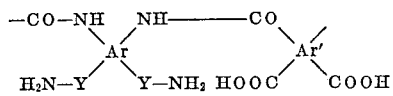

and

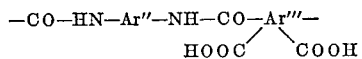

wherein Ar is a tetravalent aromatic residue selected from the group consisting of benzene, naphthalene, diphenyl, diphenyl sulfone, diphenyl ether, diphenylmethane, diphenyl sulfide and benzophenone, Ar', Ar'' and Ar''' which may be the same or different are aromatic mononuclear or polynuclear conjugated rings linked mutually with or without an atom or radical which does not participate in the reaction, and Y is a member selected from the group consisting of $SO_2$ and CO, Y and N being attached to the aromatic nucleus of the Ar at adjacent positions thereon, the molecular weight of said copolyamide corresponding to a reduced viscosity of at least 0.2 dl./g. as measured in a solution of 0.1 gram of said copolyamide in 100 ml. of dimethylsulfoxide at a temperature of 30° C.

10. A novel film-forming copolyamide according to claim 9 wherein said copolyamide is selected from the group consisting of block- and random-type copolyamides.

11. A novel film-forming copolyamide consisting essentially of in combination the repeating units of the formulae

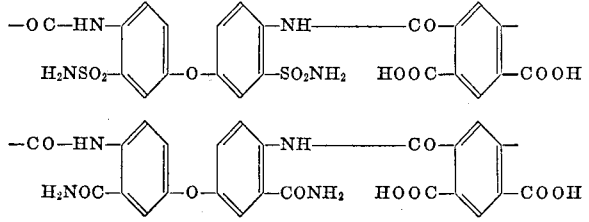

and

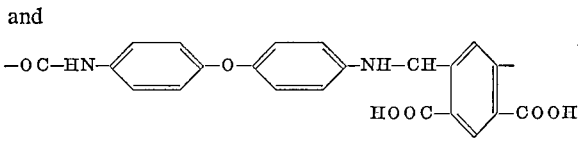

the molecular weight of said copolyamide corresponding to a reduced viscosity of at least 0.2 dl./g. as measured in a solution of 0.1 gram of said copolyamide in 100 ml. of dimethylsulfoxide at a temperature of 30° C.

12. A novel film-forming copolyamide consisting essentially of in combination the repeating units of the formulae

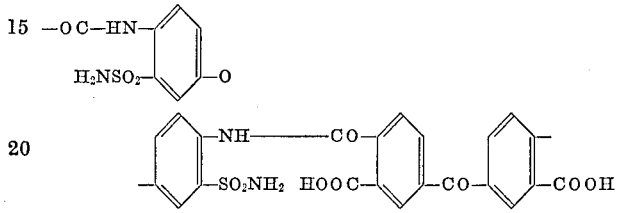

and

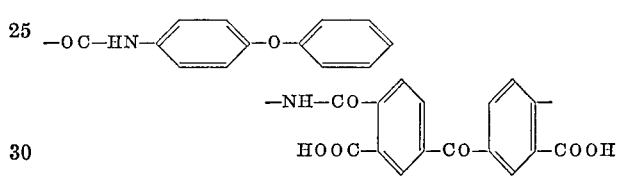

the molecular weight of said copolyamide corresponding to a reduced viscosity of at least 0.2 dl./g. as measured in a solution of 0.1 gram of said copolyamide in 100 ml. of dimethylsulfoxide at a temperature of 30° C.

13. A novel film-forming copolyamide consisting essentially of in combination the repeating units of the formulae

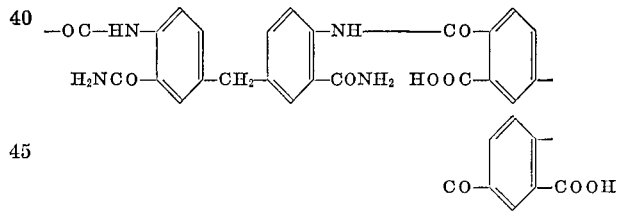

and

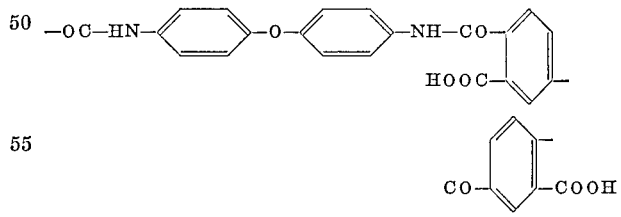

the molecular weight of said copolyamide corresponding to a reduced viscosity of at least 0.2 dl./g. as measured in a solution of 0.1 gram of said copolyamide in 100 ml. of dimethylsulfoxide at a temperature of 30° C.

14. A novel film-forming copolyamide consisting essentially of in combination the repeating units of the formulae

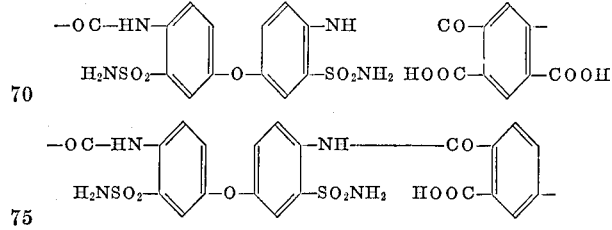

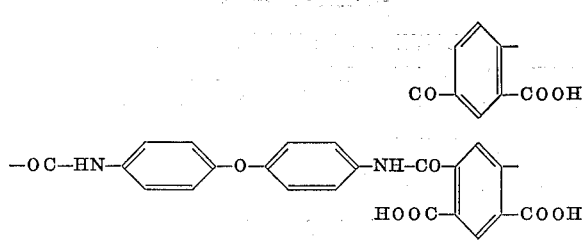

and

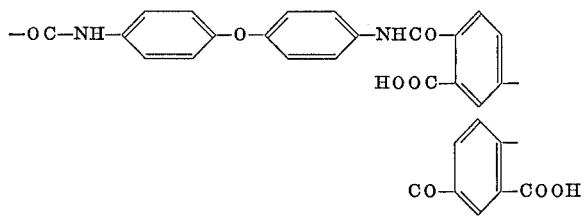

the molecular weight of said copolyamide corresponding to a reduced viscosity of at least 0.2 dl./g. as measured in a solution of 0.1 gram of siad copolyamide in 100 ml. of dimethylsulfoxide at a temperature of 30° C.

15. A process for producing a novel film-forming heterocyclic copolymer consisting essentially of in combination the repeating units of the formulae

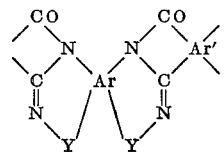

and

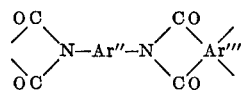

said copolymer having a softening point under a load of 1 kg. of at least 400° C., wherein Ar is a tetravalent aromatic residue selected from the group consisting of benzene, naphthalene, diphenyl, diphenyl sulfone, diphenyl ether, diphenylmethane, diphenyl sulfide and benzophenone, Ar' Ar" and Ar''' which may be the same or different are aromatic mononuclear or polynuclear conjugated linked mutually with or without an atom or radical which does not participate in the reaction, and Y is a member selected from the group consisting of $SO_2$ and CO, Y and N being attached to the aromatic nucleus o fthe Ar at adjacent positions thereon, which comprises cyclizing under dehydration by heating or by contacting with a dehydrating agent a copolyamide consisting essentially of in combination the repeating units of the formulae

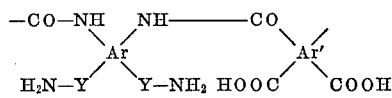

and

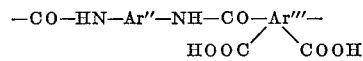

wherein Ar, Ar', Ar", Ar''' and Y as well as the positions of the aromatic nucleus of the Ar attached to Y and NH are the same as defined above.

16. A process according to claim 15, wherein the cyclization is effected by heating said copolyamide at a temperature of 200 to 400° C.

17. A process according to claim 15, wherein the cyclization is effected by contacting said copolyamide with a dehydrating agent.

18. A process according to claim 15, wherein the dehydrating agent is a complex of dimethylformamide and sulfur trioxide.

19. A process for producing a novel film-forming copolyamide consisting essentially of in combination the repeating units of the formulae

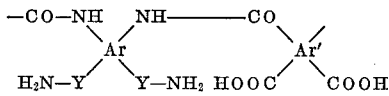

and

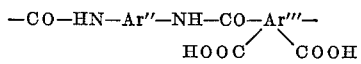

wherein Ar is a tetravalent aromatic residue selected from the group consisting of benzene, naphthalene, diphenyl, diphenyl ether, diphenyl sulfone, diphenylmethane, diphenyl sulfide and benzophenone, Ar', Ar" and Ar''' which may be the same or different are aromatic mononuclear or polynuclear conjugated rings linked mutually with or without an atom or radical which does not participate in the reaction, and Y is a member selected from the group consisting of $SO_2$ and CO, Y and N being attached to the aromatic nucleus of the Ar at adjacent positions thereon, the molecular weight of said copolyamide corresponding to a reduced viscosity of at least 0.2 dl./g. as measured in a solution of 0.1 gram of said copolyamide in 100 ml. of dimethylsulfoxide at a temperature of 30° C., which comprises reacting at least one aromatic tetracarboxylic acid dianhydride with a member selected from the group consisting of at least one aromatic diaminodiamido compound of the formulae

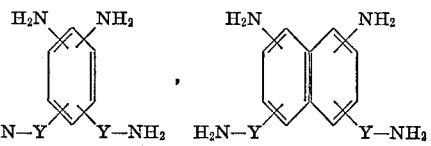

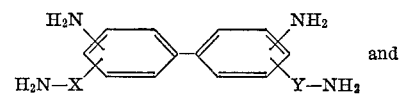

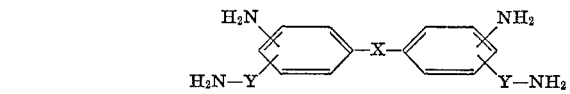

wherein Y is the same as above and X is a member selected from the group consisting of O, $SO_2$, $CH_2O$ and S, Y—$NH_2$ and $NH_2$ being attached to each aromatic nucleus at adjacent positions, and an aromatic diamine, at a temperature not exceeding more than 80° C. in the presence of an inert solvent.

20. An electroinsulated wire having a coating of a novel heterocyclic copolymer consisting essentially of in combination the repeating units of the formulae

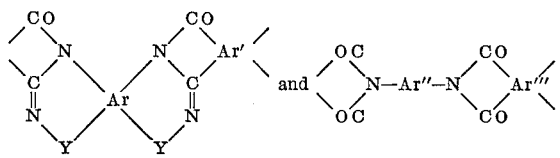

wherein Ar is a tetravalent aromatic residue selected from the group consisting of benzene, naphthalene, diphenyl, diphenyl sulfone, diphenyl ether, diphenylmethane, diphenyl sulfide and benzophenone, Ar', Ar" and Ar''' which may be the same or different are aromatic mononuclear or polynuclear conjugated rings linked mutually with or without an atom or radical which does not participate in the reaction, and Y is a member selected from the group consisting of $SO_2$ and CO, Y and N being attached to the aromatic nucleus of the Ar at adjacent positions thereon, said copolymer having a softening point under a load of 1 kg. of at least 400° C.

21. A process for producing a novel film-forming heterocyclic copolymer according to claim 15, wherein the cyclization is effected on an electroconductive wire.

22. A process for producing a novel film-forming heterocyclic copolymer according to claim 16, wherein the cyclization is effected on an electroconductive wire.

23. A process for producing a novel film-forming heterocyclic copolymer according to claim 17, wherein the cyclization is effected on an electroconductive wire.

24. A process for producing a novel film-forming heterocyclic copolymer according to claim 18, wherein the cyclization is effected on an electroconductive wire.

References Cited

UNITED STATES PATENTS 3,179,614  4/1965  Edwards _____ 260—30.2
3,461,096  8/1969  Rabilloud et al. _____ 260—47

WILLIAM H. SHORT, Primary Examiner

L. L. LEE, Assistant Examiner

U.S. Cl. X.R.

117—128.4, 232; 260—30.2, 30.6, 30.8, 32.6, 65, 78, 857